(12) United States Patent
Tran

(10) Patent No.: US 11,163,582 B1
(45) Date of Patent: Nov. 2, 2021

(54) MICROPROCESSOR WITH PIPELINE CONTROL FOR EXECUTING OF INSTRUCTION AT A PRESET FUTURE TIME

(71) Applicant: ANDES TECHNOLOGY CORPORATION, Hsinchu (TW)

(72) Inventor: Thang Minh Tran, Saratoga, CA (US)

(73) Assignee: ANDES TECHNOLOGY CORPORATION, Hsinchu (TW)

( * ) Notice: Subject to any disclaimer, the term of this patent is extended or adjusted under 35 U.S.C. 154(b) by 0 days.

(21) Appl. No.: 16/853,717

(22) Filed: Apr. 20, 2020

(51) Int. Cl.
  *G06F 9/38* (2018.01)
  *G06F 9/30* (2018.01)
  *G06F 9/22* (2006.01)

(52) U.S. Cl.
  CPC ............ *G06F 9/3869* (2013.01); *G06F 9/223* (2013.01); *G06F 9/30098* (2013.01); *G06F 9/3824* (2013.01); *G06F 9/3836* (2013.01); *G06F 9/3838* (2013.01)

(58) Field of Classification Search
  CPC ..... G06F 9/3824; G06F 9/3836; G06F 9/3838
  See application file for complete search history.

(56) References Cited

U.S. PATENT DOCUMENTS

| | | | | | |
|---|---|---|---|---|---|
| 5,961,630 | A | * | 10/1999 | Zaidi | G06F 9/3834 712/200 |
| 5,996,064 | A | * | 11/1999 | Zaidi | G06F 9/3836 712/214 |
| 2016/0371091 | A1 | * | 12/2016 | Brownscheidle | G06F 9/3855 |
| 2017/0357513 | A1 | * | 12/2017 | Ayub | G06F 9/3836 |

* cited by examiner

*Primary Examiner* — Jacob Petranek
(74) *Attorney, Agent, or Firm* — JCIPRNET

(57) ABSTRACT

In the disclosure, the microprocessor resolves the conflicts in decode stage and schedules the instruction to be executed at a future time. The instruction is issued to an execution queue until the scheduled time in the future when it is dispatched to a functional unit for execution. The disclosure uses a counter for the functional unit to track when the resource is available in the future to accept the next instruction. The disclosure also tracks the future N cycles when the register file read and write ports are scheduled to read and write operand data.

29 Claims, 6 Drawing Sheets

MICROPROCESSOR WITH PIPELINE CONTROL FOR EXECUTING OF INSTRUCTION AT A PRESET FUTURE TIME

BACKGROUND

Technical Field

The disclosure generally relates to a microprocessor, and more specifically, to a microprocessor having an execution pipeline control that issues instructions ahead of time.

Description of Related Art

In microprocessor, instructions are pipelined and executed based on the availability of operand register(s) and functional unit(s) corresponding to the instructions (i.e., conflict). The availability of the operand registers includes data dependency and availability of the read and write ports to the register file. If the operand register or the functional unit is not available, the instruction is stalled or put into a queue (e.g., instruction queue) and check again at later time before issuing to the functional unit. When the corresponding operand register and the corresponding functional unit are available, the conflict instruction is then dispatched to the corresponding functional unit for execution. There are 2 options to resolve the conflict: (1) stall the instruction in decode and continue to check until the conflict is removed in order to issue the instruction, or (2) dispatch the instruction to an execution queue and continue to check for the specific conflict at which time the instruction can be dispatched to functional unit. The first option is low performance as the instruction is stuck in decode and blocked all subsequent instructions from issuing. The second option increases the complexity as the conflict is being check in many different places. In both cases, it requires a continuous checking of resource or additional resources (queue) to track the pipeline.

SUMMARY

The disclosure keeps track of the time when the resource is available in the future and checks for availability of the operands at that future time in order to dispatch an instruction to an execution queue. The disclosure provides necessary register file read and write ports control so that the instruction in the execution queue can be sent to execution pipeline at that specific time in the future. The disclosure also provides mechanism to optionally track the operand conflict time to advance dispatch of the instruction to execution queue. Data dependency checking is in the future when the operands are more likely to have no conflict allowing the instructions to be issued and not blocking subsequent instruction. The instructions in execution queue have no conflict and will be executed at the exact time in the future with operand data which will be read and write back to the register file with preset times. The number of register file read and write ports are set for optimal design with minimal operand conflict. The advantages are solution for both bottle necks in prior art, no stalling of instruction in decode stage and resolving all operand and resource conflicts in decode stage and not at any other place.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DESCRIPTION OF THE EMBODIMENTS

Figure 1:
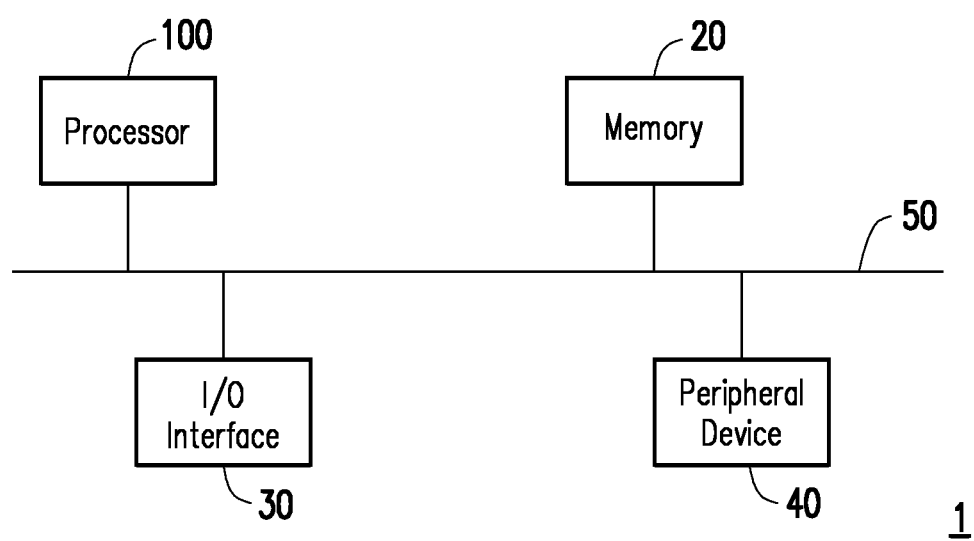
FIG. 1 is a block diagram illustrating a computer processing system in accordance with some embodiments.

The following disclosure provides many different embodiments, or examples, for implementing different features of the present disclosure. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

In a microprocessor, instructions are pipelined and processed in a sequence for maximize the parallelism of instruction execution. The pipeline of the microprocessor typically includes an instruction fetch stage, an instruction decode/issue stage, an execution stage, and a writeback stage. At the instruction decode/issue stage, conflict of the instruction in resources is determined. For example, conflict may be referred to data dependency in operand register(s), unavailability of a functional unit designated by the instruction, etc. In the case of conflict, conventional microprocessor would have 2 options (1) stall the instruction in decode/issue stage until all conflicts are resolved, or (2) put the instruction in a queue where the queue is capable of resolving the conflict and scheduling the instruction for execution. In the disclosure, the microprocessor resolves the conflicts in decode stage and schedules the instruction to be executed at a future time. The instruction is dispatched to an execution queue until the scheduled time in the future when it is dispatched to a functional unit for execution. The disclosure uses a throughput counter for the functional unit to track when the resource is available in the future to accept the next instruction. The disclosure also tracks the future N clock cycle(s) when the register file read and write ports are scheduled to read and write operand data. The disclosed microprocessor would be described in detail below.

FIG. 1 illustrates a computer processing system 1 that includes a microprocessor 100, a memory 20, an input/output (I/O) interface 30, a peripheral device 40, and a bus 50 in accordance with some embodiments. The bus 50 may allow bi-direction communications among the components of the computer processing system 1. Some embodiments of the disclosure may use more, less, or different components than those illustrated in FIG. 1. As an example, the computer processing system 1 may further include a timer, a serial peripheral interface, a digital-to-analog converter, an analog-to digital converter, a display driver, a plurality of types of memory, and any other suitable components.

In some embodiments, the microprocessor 100 is configured to execute instructions using an instruction pipeline, in which the execution of the instruction may be decomposed to several stages such as an instruction fetch stage, an instruction decode/issue stage, an execution stage and a writeback stage. The microprocessor 100 may include caches such as a data cache and an instruction cache that have relatively high access rates. The data cache for the microprocessor 100 may be multi-level data cache that may include a L1 data cache, a L2 data cache, and a L3 data cache. The L1 data cache, L2 data cache and the L3 data cache may be located inside or outside the microprocessor 100. In some embodiments, the computer processing system 1 includes a plurality of microprocessors.

The memory 20 is configured to store program codes of instructions and data that are needed for the execution of the instructions. The memory 20 may include non-volatile memory or volatile memory or a combination thereof. For example, the memory 20 may include at least one of random access memory (RAM), dynamic random access memory (DRAM), static random access memory (SRAM), read only memory (ROM), programmable read only memory (PROM), electrically programmable read only memory (EPROM), electrically erasable programmable read only memory (EEPROM), and flash memory.

The I/O interface 30 is configured to couple input devices and output devices to the computer systems 1 through the bus 50. The computer system 1 may receive data from the input devices and send data to the output devices through the I/O interface 30. The I/O interface 30 may include at least one of a serial connection interface and a parallel connection interface in wired or wireless connections. The peripheral device 40 may include a keyboard, a mouse, a sensor, a signal receiver, a monitor and any other suitable devices.

Figure 2:
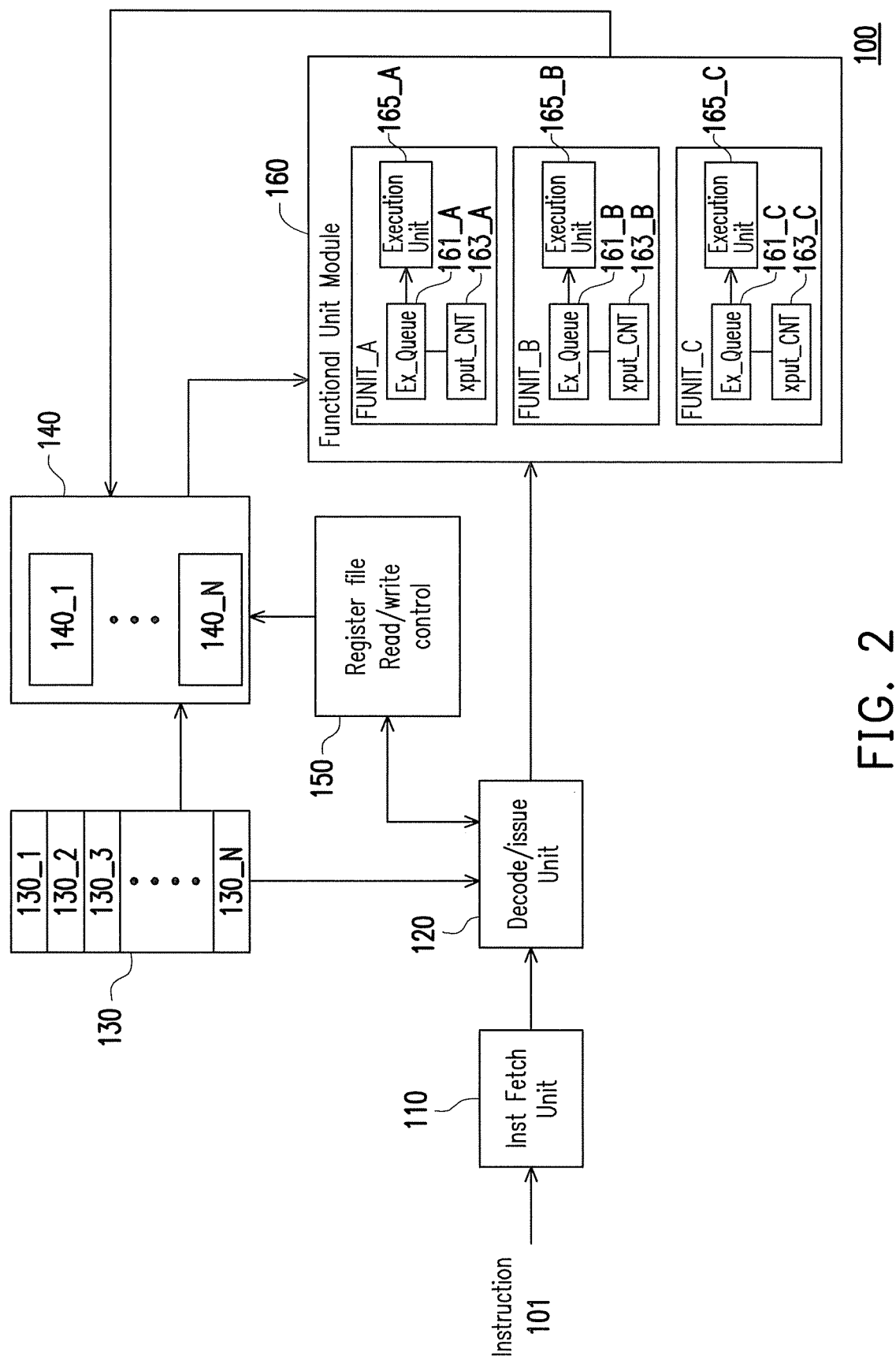
FIG. 2 is a block diagram illustrating an instruction pipeline architecture of the microprocessor in accordance with some embodiments.

FIG. 2 is a block diagram illustrating an instruction pipeline architecture of the microprocessor 100 in accordance with some embodiments. The process described below may be executed by a processor having the architecture as illustrated in FIG. 2. In the embodiment, the microprocessor 100 may include an instruction fetch unit 110, an decode/issue unit 120, a register file scoreboard 130, a register file 140, a register file read/write control unit 150, and a functional unit module 160. The instruction fetch unit 110 is coupled to the decode/issue unit 120. The decode/issue unit 120 is coupled to the register file 140 via the scoreboard 130, where the decode/issue unit 120 accesses the register scoreboard 130 to check the status of the data stored in the operand register to be used by the instruction. The scoreboard 130 is coupled to the decode/issue unit 120 and mapped to the register file 140 and includes a plurality of entries 130_1-130_N. The decode/issue unit 120 is coupled to the functional unit module 160 where the instructions are executed. The decode/issue unit 120 is also coupled to the register file read/write control unit 150 for reading data from the register file 140 and writeback result data from the functional unit module 160 to the register file 140.

The register file 140 may include a plurality of registers 140_1-140_N that are configured to store data. The registers 140_1-140_N may store data of the operands that are used for execution of the instruction 101, and/or the result data that are written back to the register file 140 through the writeback operation of the issued instruction 101. The size and number of the registers 140_1 through 140_N may vary according to the architecture of the microprocessor 100. In the embodiments, the register file 140 may include a write port and a read port for the functional unit 160 to access registers in the register file 140. The register file read/write control unit 150 schedules the specific access times for the functional unit module 160 to access data from the register file 140.

The functional unit module 160 includes a plurality of functional units FUNIT_A, FUNIT_B, FUNIT_C. In the embodiments, the functional unit module 160 may include a number of operations including, but not limited to, integer multiply, integer divide, an arithmetic logic unit (ALU), shifter, an address generation unit (AGU), a floating-point unit (FPU), a load-store unit (LSU). Although three functional units FUNIT_A, FUNIT_B, FUNIT_C are illustrated in FIG. 2 as example, the disclosure is not intended to limit the number of functional units. In other embodiments, more function units may be included in the functional unit module 160.

Each of the functional units FUNIT_A, FUNIT_B, FUNIT_C includes or coupled to an execution queue 161_A, 161_B, 161_C, an accumulate throughput counter 163_A, 163_B, 163_C, and an execution unit 165A, 165B, 165C. The reference numbers of the execution queue, accumulate throughput counter, and execution unit are simplified to 161, 163, 165 in the following for brevity. The execution queue 161 includes a plurality of entries, which is configured to record instructions dispatched from the decode/issue unit 120 in an order that is to be sent to the execution unit 165. The disclosure is not intended to limit the number of the entries in the execution queue 161, the embodiments may have any number of entries according to the design requirement. Each entry includes a plurality of fields which are configured to record various information related to the corresponding instruction. For example, one of the fields in the execution queue entry records a throughput time of the corresponding instruction. Further detail of each field within the entry of the execution queue 161 would be explained later. The counter value of accumulate throughput counter 163 indicates the time in the future when the next instruction in decode/issue unit 120 can be sent to the execution unit 165. The counter value of the accumulate throughput counter 163 may be a throughput time of a single instruction, micro-ops instructions, and/or accumulative throughput time of a plurality of issued instructions. The accumulate throughput counter 163 decrements by one for every clock cycle. The accumulate throughput counter 163 may be implemented by various type of hardware registers, flip-flop, logic circuits, etc, where the disclosure is not intended to limit the implementation of the counter. In the embodiment, the counter value of the accumulate throughput counter 163 indicates the number of clock cycles for the next instruction to be accepted by the execution unit 165. In other words, the counter value of the accumulate throughput counter 163 also indicates when an instruction in the decode/issue unit 120 would be executed by the corresponding execution unit 165 in a future time if dispatched to the functional unit module 160. In the following, the process flow of an instruction through the execution pipeline illustrated in FIG. 2 would be described in detail.

When an instruction 101 is received by the microprocessor 100, the instruction unit 110 fetches the instruction 101 from instruction cache (not shown). In the embodiments, the instruction 101 may include source operand(s) and destination operand(s) in reference to a register 140_X in the register file 140, where the register 140_X is referring to any register within the registers 140_1-140_N. The instruction 101 may be a scalar instruction or a vector instruction depending on the architecture of the microprocessor 100. The instruction 101 includes the instruction type, FUNIT_A, FUNIT_B, or FUNIT_C of the functional unit 160 to which the instruction 101 would be sent for execution.

The fetched instruction 101 is then sent to the decode/issue unit 120 for decode and issue. An instruction may have the following 4 basic types of conflicts: (1) data dependency which includes write-after-read (WAR), read-after-write (RAW), and write-after-write (WAW), (2) availability of read port to read data from the register file 140 to the functional unit 160, (3) availability of the write port to write back data from the functional unit 160 to the register file 140, and (4) the availability of the functional unit 160 to execute data. Conventionally, the decode/issue unit 120 resolves conflicts (1), (2), and (4) in the next clock cycle for the instruction 101 to be dispatched to the functional unit 160, else the instruction 101 would be stalled in the decode/issue unit 120 until the resource conflict is resolved. The functional unit 160 arbitrates for a write port to write back data to the register file 140. The instruction 101 may stall in the functional unit 160 until a write port is available to write back data to the register file 140. The instruction stalls in functional unit 160 creates a conflict for the next instruction in the decode/issue unit 120. The availability of the functional unit 160 is caused by the generic throughput time of the instruction or by stalling of instruction from being unable to write back to the register file 140. The instruction throughput time is the time when the next instruction can be accepted by the execution unit 165. For example, an integer divide operation has a throughput time of 6 cycles while most instructions have single cycle throughput time. When there is no conflict, the instruction 101 is sent to the functional unit module 160 for execution.

In the embodiments, the decode/issue unit 120 checks for all conflicts before the instruction 101 can be dispatched to the functional unit 160. The decode/issue unit 120 accesses the register file scoreboard 130 mapped to the register file 140 to check data dependency of the source operand and/or the destination operand and allocates the data. The decode/issue unit 120 accesses the register file read/write control unit 150 to check for the availability of the read and write ports and allocates the read and write ports for accessing data from the register file 140. Depending on the instruction type of the instruction 101, the decode/issue unit 120 checks for availability of the functional unit corresponding to the instruction 101 (e.g., FUNIT_A, FUNIT_B, or FUNIT_C) of the functional unit module 160 before sending the instruction 101 to the functional unit. In some embodiments, the instruction 101 enters an execution queue 161 before sending to the execution unit 165. One source of conflict in the functional unit 160 is the execution queue 161 being full. In this case, the instruction 101 will be stalled in the decode/issue unit 120. The instruction in the execution queue 161 can be sent to execution unit 165 only if the execution unit 165 is not busy. The execution queue 161 may have many instructions where each instruction has a specific time in the future that it can be sent to the execution unit 165 for execution. The accumulate throughput counter 163 indicates the time in the future when the instruction 101 in the decode/issue unit 120 can be executed by the execution unit 165. In the embodiments, the decode/issue unit 120 resolves all conflicts at the time of the accumulate throughput counter 163 to issue the instruction 101. The decode/issue unit 120 schedules the exact cycle times in the register file read/write control unit 150 to read and write operand data from and to the register file 140 by the functional unit 160 and dispatches the instruction 101 to the execution queue 161 where the instruction 101 is scheduled to be dispatched to the execution unit 165 from the execution queue 161.

When the instruction 101 is received by the functional unit module 160, the corresponding functional unit is scheduled to receive data from the register file 140. The functional unit module 160 is configured to execute the instruction 101, and then write back a result data to the destination operand (one or more register entry) in the register file 140 at a scheduled time. The instruction 101 to be executed by the functional unit includes a set of operands that are stored in the register file 140 or other storage memory (e.g., memory 20). The functional unit (FUNIT_A, FUNIT_B, or FUNIT_C) corresponding to the instruction 101 is scheduled to receive operand data from the register file 140 through the available read ports of the register file 140 for the execution. The instruction 101 is dispatched to the execution queue 161, and then issued to the execution unit 165 from the execution queue 161 at a specific time in the future. Each instruction is kept in an entry of the execution queue 161, and each entry has a throughput count field. When the instruction is issued from the execution queue 161 to the execution unit 165, the throughput count is counted down to zero before the next instruction is allowed to issue to the execution unit 165. The result data outputted by the functional unit module 160 may be written to the register file 140 in a writeback operation through available write port of the register file 140 at a scheduled time. The total time in execution by execution unit 165 is the known latency time of the instruction 101. Depending on the instruction type, the latency time may be different for different instruction type. In some embodiments, the result data of the functional units FUNIT_A, FUNIT_B, FUNIT_C may be forwarded to the functional unit of a subsequent instruction in the execution pipeline to improve performance of the microprocessor 100. The register file read/write control unit 150 keeps track of the times when the instruction is sent from the execution queue 161 to the execution unit 165 to schedule the operand data on read port(s) of the register file 140. The register file read/write control unit 150 also keeps track of the latency time when the result data is scheduled on write port(s) of the register file 140 from the execution unit 165. The read and write times of operand data of all instructions are known by the register file read/write control unit 150, so the register file read/write control unit 150 can schedule forwarding of data from the write port and to the read port. The latency time of the instruction 101 may be different for each instruction type even in the same functional unit. For example, 8-bit, 16-bit, and 32-bit divide instructions have different throughput and latency times in the same functional unit. Each of the functional units in the functional unit module 160 has different execution times which is the specific latency time of the instruction 101. The timing of the read/write control unit 150 to access the register file 140 and the execution queue 161 to dispatch instruction 101 to the execution unit 165 must be in perfect synchronization.

The register file 140 may include a number of read and write ports that fetch data for the functional unit module and write back result data from the functional unit module. The register file read/write port control 150 sets times in the future when the data should be read from and written to the register file 140 for the functional unit corresponding to the instruction 101. Each instruction has known latency time when the result data is valid for writing back to the register file 140 from the functional unit 160, so the read and write port control 150 can schedule the exact time for the read or write port of a specific register 140_X. The read and write port control 150 keeps track of which read or write port is busy at which time. The read and write port is another resource conflict for the instruction in addition to the functional unit conflict. The number of read and write ports are selected for the optimal performance of an application.

Figure 3:
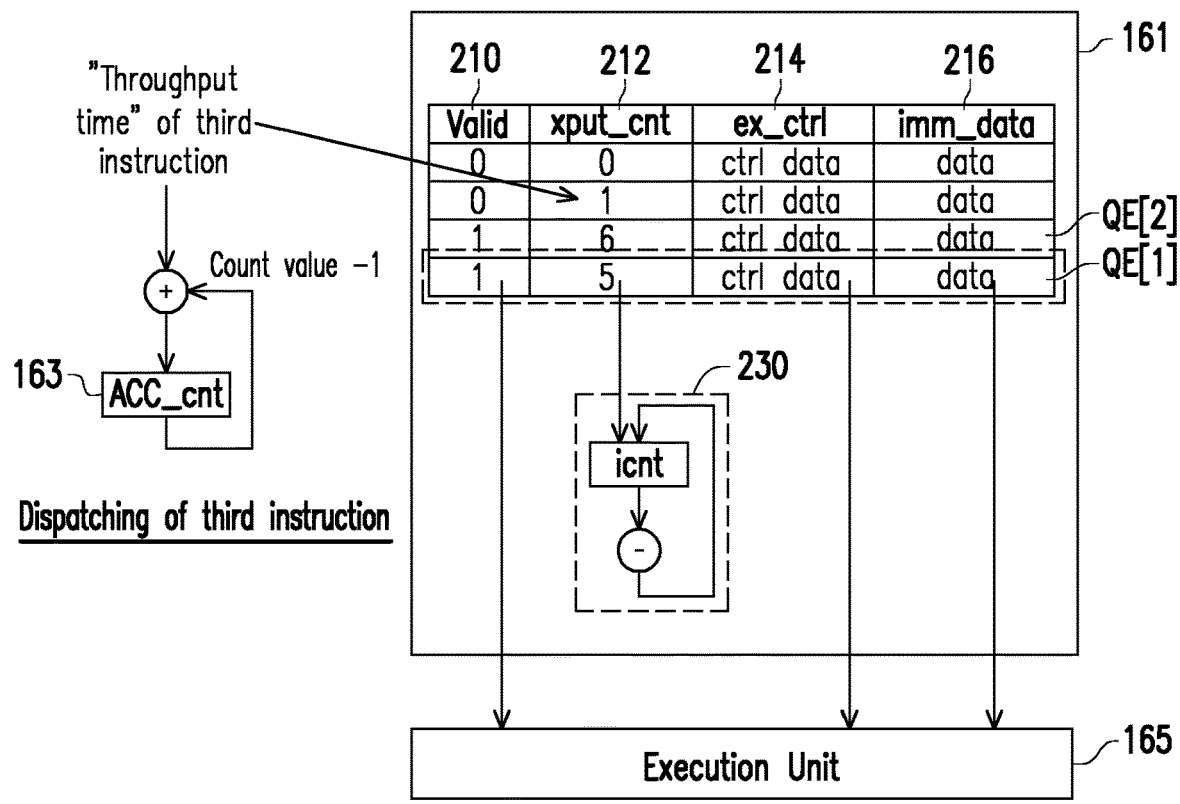
FIG. 3 is a diagram illustrating an execution queue of the functional unit according to one of the embodiments of the disclosure.

FIG. 3 is a diagram illustrating an execution queue of the functional unit according to one of the embodiments of the disclosure. The execution queue 161 of FIG. 2 is shown in FIG. 3 with 4 entries as an example, each entry includes 4 fields, which are a valid field (also referred to as valid bit) 210, a throughput count field 212, an execution control data 214, and an immediate data 216. Each entry of the execution queue 161 records information regarding an instruction dispatched by the decode/issue unit 120. However, the disclosure is not intended to limit the fields recorded in each entry of the execution queue 161. In other embodiments, there may be more or fewer fields which are necessary information for the instruction to be executed by the execution unit 165. In the embodiments, the execution control data 212 (i.e., a column labeled with "ex_ctrl") and immediate data 216 (i.e., a column labeled with "Imm_data") are derived from the corresponding instruction. The valid field 210 (i.e., a column labeled with "Valid") indicates whether the entry is valid or not. For example, the first and second entries QE[1], QE[2] of the execution queue 161 illustrated in FIG. 3, which represents a first instruction and a second instruction in the execution queue 161, are valid as indicated by "1" in the valid field 210. In the embodiments, the first instruction is to be executed by the execution unit 165 before the second instruction. The first valid instruction has the throughput count of 5 as indicated by throughput count field 212 (i.e., a column labeled with "xput_cnt"). In the embodiments, the execution queue 161 further includes an instruction counter 230 utilized for tracking the throughput time of an instruction that is sent to the execution unit 165. The instruction counter 230 receives the throughput time recorded in the execution queue entry and decrement by one for every clock cycle until it reaches zero.

FIG. 3 shows the first instruction (recorded in the first entry QE[1]) being sent to the execution unit 165, the throughput count of 5 enters the instruction counter 230. The instruction counter 230 has to count down to zero before the second instruction can enter the execution unit 165. When the instruction counter 230 counts down to zero, the valid bit of the first entry is reset and second entry can be processed. The second instruction recorded in the second entry QE[2] is sent to the execution after the first instruction is completed, the instruction counter 230 is loaded with the throughput count of 6 from the second entry. The instruction counter 230 counts down to zero before the next valid instruction can be sent to execution unit 165. The throughput counts of zero indicate that instructions are pipelined to the execution unit 165 in consecutive cycles.

The throughput time from each valid instruction in the execution queue 161 are accumulated and asserted into the accumulate throughput counter 163, so that the decode/issue unit 120 knows the accumulated throughput time before dispatching a next instruction to the execution queue 161. Taking the execution queue 161 as illustrated in FIG. 3 as an example, before the first and second instructions are dispatched to the execution unit 165, the first and second instructions has the throughput count of 5 and 6, respectively, and the accumulate throughput counter 163 has an accumulated count value of the first and second instructions which has count of 11. The accumulated count value of 11 in the accumulate throughput counter 163 indicates that in 11 clock cycles a third instruction can be sent to execution unit 165. In other words, the execution unit 165 will be available in 11 clock cycles for executing the third instruction. The decode/issue unit 120 uses this accumulated count value of 11 to check for data dependency and the availability of read port(s) at 11 clock cycle in the future for the third instruction. Furthermore, the decode/issue unit 120 must also check for availability of the write port of the third instruction. For example, if the latency time of the third instruction is 12 clock cycle, then the result data will be written back from the functional unit 160 to the register file 140 at time 23 in the future. That is, 11 clock cycles to start execution by the execution unit 165 and 12 clock cycles to complete and produce the result data. A write port must be available at time 23 in order for the third instruction to be dispatched from the decode/issue unit 120 to the execution queue 161.

If the third instruction has a throughput time of 6. At the time when the third instruction is to be dispatched by the decode/issue unit 120, the third instruction will set the valid field 210 of the third entry of the execution queue 161, write the throughput count field 212 of the third entry with 6, and write control data 214 and immediate data 216 of the third entry with data derived from the third instruction. In addition, the accumulate throughput counter will be set to 16. This is because the previous accumulate count value would be count down from 11 to 10 by the time the third instruction is dispatched to the execution queue 165, and 10 plus the throughput count of 6 of the third instruction would be 16. The number of read and write ports are designed for optimal performance such that the read port(s) conflict at time 11 and write port(s) conflict at time 23 are rare occasions. With reference to FIG. 3, at the time when the third instruction is dispatched, the throughput time of the third instruction (e.g., 6) is written to the throughput count field 212 of the third entry. The throughput time of the third instruction is also sent to the accumulate throughput counter 163, where an adder adds the output of the accumulate throughput counter 163 with the throughput time of the third instruction. In this embodiment, once a data dependency, or read port conflict, or write port conflict is detected, then the instruction is stalled in the decode/issue unit 120 until after the accumulate throughput counter is zero.

Figure 4:
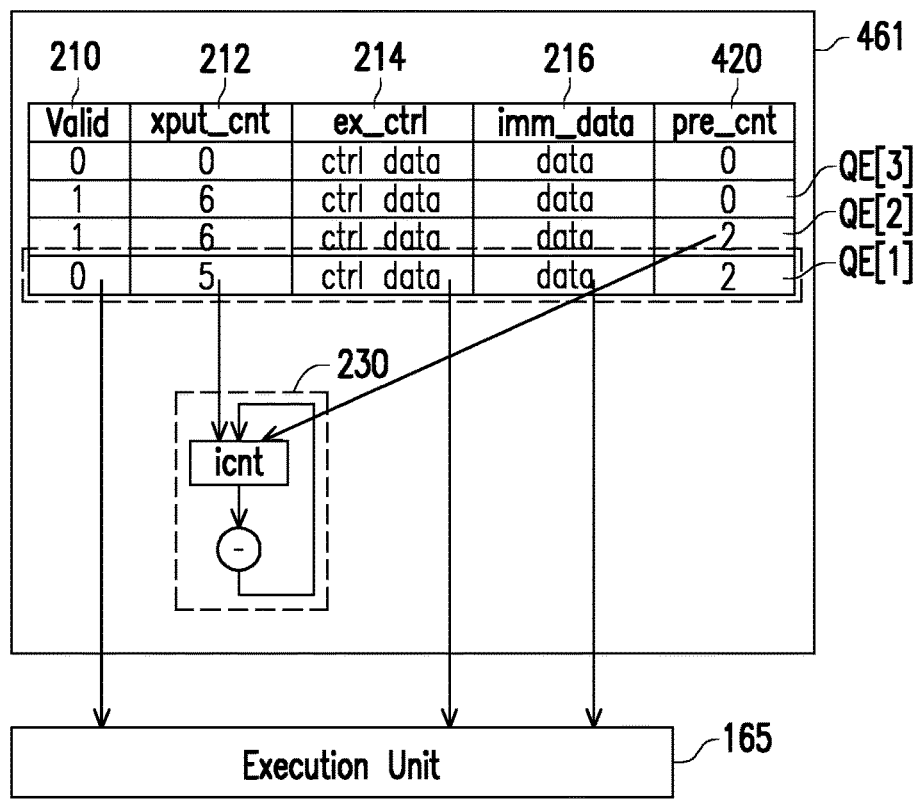
FIG. 4 is a diagram illustrating an execution queue of the functional unit according to one of the embodiments.

FIG. 4 is a diagram illustrating an execution queue of the functional unit according to one of the embodiments. In the embodiment, each entry of the execution queue 461 further includes a pre-counter field 420, as to overcome the single issue time as described above. In the above example, if the accumulate throughput counter 163 has a count value of 11, the decode/issue unit 120 checks for data dependency and availability of read port(s) at time 11 and write port(s) at time 23 for dispatching the third instruction. If there is data dependency or read port conflict or write port conflict, then the decode/issue unit 120 checks for data dependency and availability of read port(s) again at time 11 and write port(s) again at time 23 in the next clock cycle where the accumulate throughput counter 163 value would be decremented to 10. The decode/issue unit 120 continues to check for data dependency and availability of the read port(s) at time 11 and write port(s) at time 23 until the third instruction can be dispatched to the execution queue 161. In the embodiment, the difference between the time 11 and the count value of the accumulate throughput counter 163 is set for the pre-counter 420. For example, if it is determined that the third instruction can be dispatched when the accumulate throughput counter 163 value is 9, then the pre-counter 420 is set to 2. When the second instruction with the throughput count of 6 from throughput count field 212 is sent to the execution unit 165, then the instruction throughput counter 230 is set to 6 and counts down to zero before the second entry is invalidated. Afterward, the pre-count value of 2 from the pre-counter field 420 is loaded to the instruction throughput counter 230 and counts down to zero before third instruction can be sent to the execution unit 165.

Figure 5:
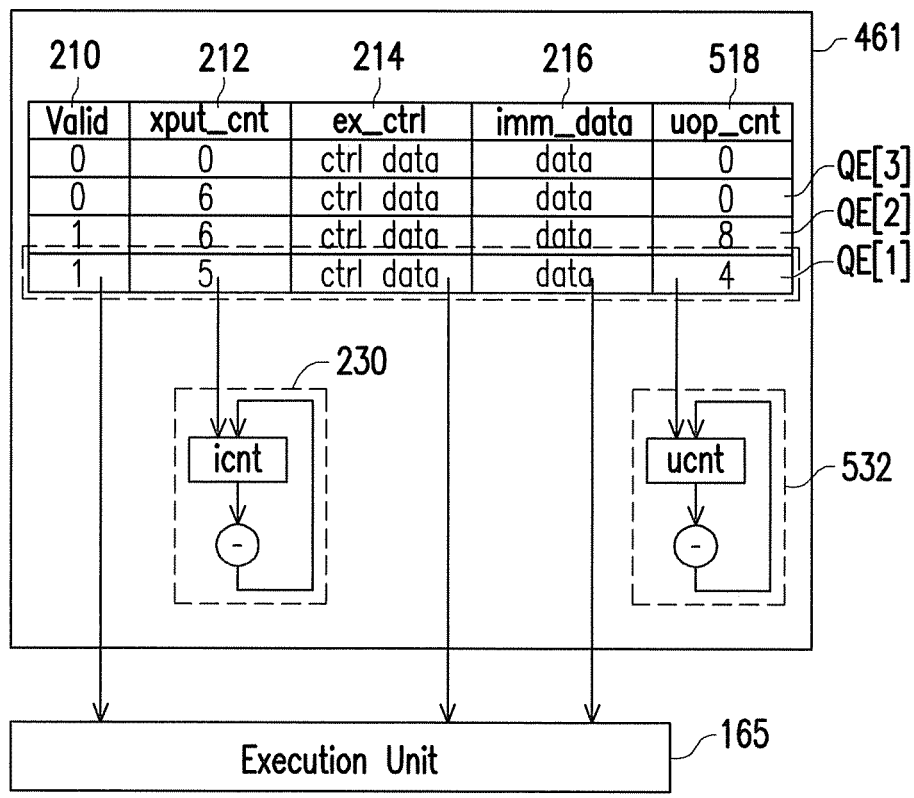
FIG. 5 is a diagram illustrating an execution queue of a functional unit according to one of the embodiments of the disclosure.

FIG. 5 is a diagram illustrating an execution queue of a functional unit according to one of the embodiments of the disclosure. In the embodiment, the instruction 101 is a vector instruction which consists of micro-operations (micro-ops). The microprocessor 100 executes vector instructions. Vector instruction can be programmed to operate on multiple consecutive vector registers and the register file 140 contains vector registers. For example, the first micro-op of vector add instruction can be source operand registers 140_A and 140_B and write back to destination register 140_C while the second micro-op vector add instruction has a second vector add operation with source operand registers 140_A+1 and 140_B+1 and write back to destination register 140_C+1. The vector add instructions can be programmed to have 1 to 8 micro-ops as an example. With reference to FIG. 5, the execution queue 561 further includes a micro-op count field 518 in addition to the valid field 210, the throughput count field 212, the execution control data 214, and the immediate data 216 in the embodiment illustrated in FIG. 3. The embodiment may also include the pre_count field 420 as illustrated in FIG. 4. The micro-op count field 518 is added to the execution queue 561 to specify the number of micro-ops and counts down the number of micro-ops. The execution queue 518 also includes a micro-op counter 532 decrement for every micro-op dispatching to execution unit 165 to track the number of micro-ops that is executed. In the embodiment, the micro-op counts down to zero before the corresponding entry can be invalidated. In the example, the instruction in the first entry has 4 micro-ops with throughput latency of 5. Every 5 clock cycles, a micro-op is sent to the execution unit 165. The micro-op field 518 shows that there are 4 micro-ops, and therefore, the total latency for the first instruction in the first entry QE[1] is 20 cycles. Similarly, the total latency for the second instruction in the second entry QE[2] is 48 cycles, since there are 8 micro-ops and each has latency time of 6 cycles. The accumulate throughput counter 163 is set to 68 cycles. For dispatching the third instruction, the decode/issue unit 120 will check for data dependency and read port conflict at time 68 and write port conflict at time 80. The size of the counter field may be 8 bits or any other suitable number of bits based on design requirement. The non-zero throughput count in field 212 is used to illustrate the operation of the accumulative throughput counter 163. Most instructions have throughput count of 1 or the throughput count in field 212 is set to zero.

In some embodiments, the scoreboard 130 is utilized to check the data dependency conflict. Referring back to FIG. 2, the scoreboard 130 is coupled to the decode/issue unit 120 and mapped to the register file 140. The scoreboard 130 includes a plurality of entries 130_1-130_N (also be referred to as scoreboard entries), where each of the entries 130_1-130_N includes a register accessing counter which is configured to count down according to the clock cycle of the microprocessor 100. For example, the register accessing counter would decrement by one at rising or falling edge of each clock cycle of the microprocessor 100. In the embodiments, the number of scoreboard entries may equal to the number of registers in the register file 140. For example, if the register 140 includes 32 registers, the scoreboard 130 would include 32 entries, where one scoreboard entry is mapped to one register in the register file 140 for tracking the status of the register. However, the disclosure is not intended to limit the number of the entries in the scoreboard 130. In other embodiments, the number of the scoreboard entries may be greater or less than the number of the registers in the register file 140.

Figure 6:
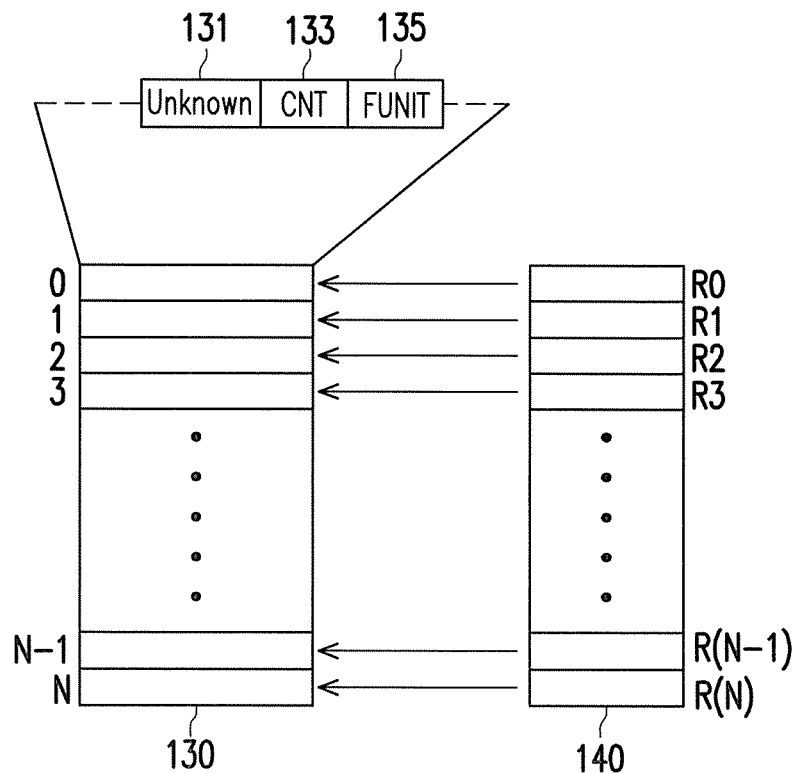
FIG. 6 is a diagram illustrating an exemplary scoreboard having a total of N entries in accordance with some embodiments of the disclosure.

FIG. 6 is a diagram illustrating an exemplary scoreboard having a total of N entries in accordance with some embodiments of the disclosure. Each entry of the scoreboard 130 may include, but not limited to, an unknown field 131, a register accessing counter field 133, and a functional unit field 135. In the embodiments, the an unknown field 131 is configured to indicate that the execution latency time of the issued instruction is unknown. For example, if the issued instruction is a load instruction, the unknown field of the scoreboard entry corresponding register of the load instruction would be set (logic 1 or 0), because the load operation would dependent on the location of the data. If the data is stored in data cache, it may take 2 clock cycles to load. However, if the data is stored in a memory (e.g., RAM) coupled to the microprocessor, it may take 50-100 clock cycles to load. Integer divide (INT DIV) operation is another example of an instruction having unknown execution latency time. The execution latency time of integer divide operation is unknown for 6 clock cycle since it may take up to 6 clock cycles to determine the number of digits to divide. Therefore, the unknown bit would be set for the first 6 clock cycles, and then reset after the integer divide operation has determined the number of digits. Also, the register accessing counter field would be set to the known time after reset of the unknown bit in the unknown field 131. In the embodiments, the size of the unknown field may be 1 bit or any other suitable number of bits based on design requirement. The FUNIT field 135 is configured to record the functional unit from which the result data is written back. In some embodiments, the FUNIT field may be used for forwarding the result data to the subsequent instruction. For example, an ADD instruction is to access register 140_3 which has a data dependency on the destination operand of the previous MUL instruction. In such case, the FUNIT field of the scoreboard entry may record MUL, and the result data of the MUL instruction may be forwarded to the ADD functional unit directly by configuring the logic within the functional unit module 160. Note that the FUNIT of the first and second instructions may be the same functional unit.

The register accessing counter field 133 of each entry 130_1-130_N may be set at the decode/issue stage of instruction pipeline by the decode/issue unit 120, for example, at a stage when the instruction reads the scoreboard 130 to check the data dependency of the operands.

Since an execution latency time (may also be referred to as a write time) of the instruction is known, the instruction may set the register accessing counter based on the execution latency time of the instruction. For example, a first instruction (e.g., an ADD instruction) would take 2 clock cycles (e.g., execution and writeback stages) to write back the result data to register 140_3. In other words, the first instruction has an execution latency time of 2 clock cycles. The register accessing counter mapped to the register 140_3 in the scoreboard 130 would be set to 2. This indicates that the register 140_3 would not be ready for a second instruction subsequent to the first instruction until 2 clock cycles later. At every clock cycle of the microprocessor, the register accessing counter mapped to the register 140_3 decrements until the value of the counter self-resets itself when the count value becomes 0 which means no data dependency. When the second instruction subsequent to the first instruction is received by the decode/issue unit 120, if the second instruction is decoded to be an instruction that reads the register 140_3, this type of data dependency is referred to as write-after-write (RAW) dependency. If the second instruction is decoded to be an instruction that writes to the register 140_3, this type of the data dependency is referred to as a write-after-write (WAW) dependency.

In another embodiment, the register accessing counter value of the register accessing counter field is set to a throughput time (also referred to as read time) of the instruction at dispatching of the instruction. The read time represents the number of clock cycles for a functional unit to read the source data of corresponding register for execution. In the disclosure, the read time is the value of the accumulative throughput counter 163 of FIG. 2. For example, if a first instruction is to read data in 8 clock cycles from a register 140_5, the register accessing counter field of the scoreboard entry 130_5 which is mapped to the register 140_5 is set to 8. Next, a second instruction subsequent to the first instruction is decoded to be an instruction that writes the register 140_5. This type of data dependency is referred to as write-after-read (WAR). The second instruction reads the scoreboard entry 130_5 mapped to the register 140_5 and determines that there is a data dependency.

In yet other embodiment, the register accessing counter field 133 of each scoreboard entry 130_1-130_N may include a first register accessing counter field and a second register accessing counter field that respectively stores the write time and the read time associated to the corresponding register.

Referring back to the embodiment illustrated in FIG. 3, the decode/issue unit 120 uses this accumulate throughput value of 11 to check for data dependency and the availability of read port(s) in the future and the availability of the write port(s) at time 23 in the future in order to dispatch the third instruction. In some embodiments, the decode/issue unit 120 further includes the register accessing counter value stored in the scoreboard 130 in addition to the accumulated count value kept in the accumulate throughput counter 163 to check for the data dependency, read-port and write-port conflict. At time for dispatching the third instruction, the decode/issue unit 120 accesses the accumulate throughput counter 163 and the scoreboard 130. For example, the scoreboard entry of the corresponding register has a value of 16 meaning that if the instruction is dispatched to the execution unit at time 16, then there would not be a data dependency. The decode/issue unit 120 checks again for any conflicts at time 16 in the future. If there is no conflict, the third instruction is dispatched to the execution queue 161, and the pre_cnt field 420 is set to 5, i.e., 16-11. If there is a conflict, the third instruction is stalled in the decode/issue unit 120 for one clock cycle, and then the decode/issue unit 120 checks for any resource conflicts at time 16 in the future again. Based on the above, an instruction having data dependency can still be issued to the functional unit module 160 (e.g., the instruction would be dispatched to an execution queue and then issued to an execution unit) instead of being stalled in the decode/issue unit 120. As mentioned above in one of the embodiments, the register accessing counter field 133 may store both the write time and read time independently. In such case, the decode/issue unit 120 uses the write time or the read time that has the longest time (a worst case scenario) for checking the resource conflict.

Figure 7:
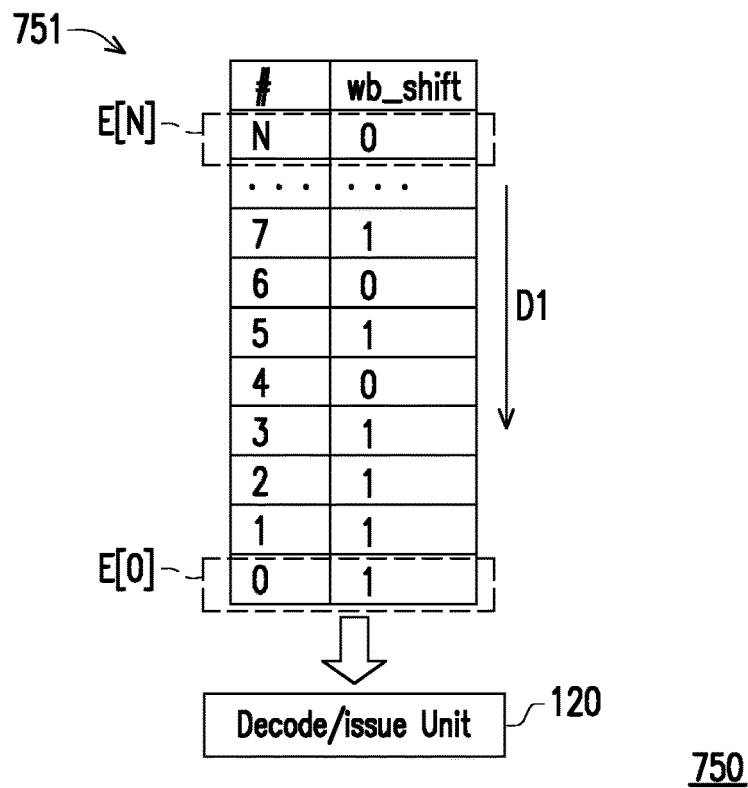
FIG. 7 is a diagram illustrating a register file read/write control unit 750 according to some embodiments of the disclosure.

FIG. 7 is a diagram illustrating a register file read/write control unit 750 according to some embodiments of the disclosure. In the embodiments, the register file read/write control unit 750 includes a latency shifter 751 for each write port of the register file 140. The latency shifter 751 may include a plurality of shifter entries E[0]-E[N], where the shifter entries are configured to be shifted every clock cycle in a direction D1. The shifter entry E[0] is referred to as the bottom shifter entry (e.g., least significant bit, LSB) and the shifter entry E[N] is referred to as the top shifter entry (e.g., most significant bit, MSB). The latency shifter 751 may shift out the bottom shifter entry E[0] every clock cycle. Each shifter entry of the latency shifter 751 is associated with a clock cycle (e.g., $X^{th}$ clock cycle, where x is a positive integer), and each shifter entry includes a writeback value (e.g., wb_shift[x]) that indicates an availability of a write port of the register file 140 at the clock cycle. The writeback value wb_shift[x] may be a multi-bit value or a single-bit value that indicates either the logic value of "1" and the logic value of "0". For example, when the writeback value wb_shift[x] (e.g., wb_shift[5] in entry E[5]) is the logic value of "1", it indicates that write port is not available for the writeback operation in the $X^{th}$ clock cycle (e.g., $5^{th}$ clock cycle). In other words, there is another writeback operation that is going to be performed to the write port in the $X^{th}$ clock cycle. Alternatively, when the writeback value wb_shift[x] (e.g., wb_shift[4] in entry E[4]) is the logic value of "0", it indicates that the write port is available for the writeback operation in the $X^{th}$ clock cycle (e.g., $4^{th}$ clock cycle). In some embodiments, the writeback values of the latency shifter 751 are set upon the issuance of the instructions from the decode/issue unit 120 to the functional unit module 160.

In the embodiments, the issue/decode unit 120 may control the dispatching of an instruction based on the writeback values wb_shift[0]-wb_shift[N] stored in the shifter entries E[0] through E[N] of the latency shifter 751. The writeback values wb_shift[0]-wb_shift[N] are used for determining whether there is a resource conflict (particularly a write port conflict) at a particular time in the future. Taking the example illustrated in FIG. 3 as example, at dispatching of the third instruction, the decode/issue unit 120 uses this accumulated count value of 11 to check for data dependency and the availability of write port(s) at $23^{th}$ clock cycle in the future (i.e., the current accumulated throughput count value from the execution queue plus a known latency time of 12 clock cycles for the third instruction) by accessing the writeback value wb_shift[23] stored in the latency shifter 751. If there is a write port conflict, the third instruction is stalled in the decode/issue unit 120 until the next clock cycle. If no write port conflict is detected at time 23, the decode/issue unit 120 dispatches the third instruction to the execution queue 161.

Figure 8:
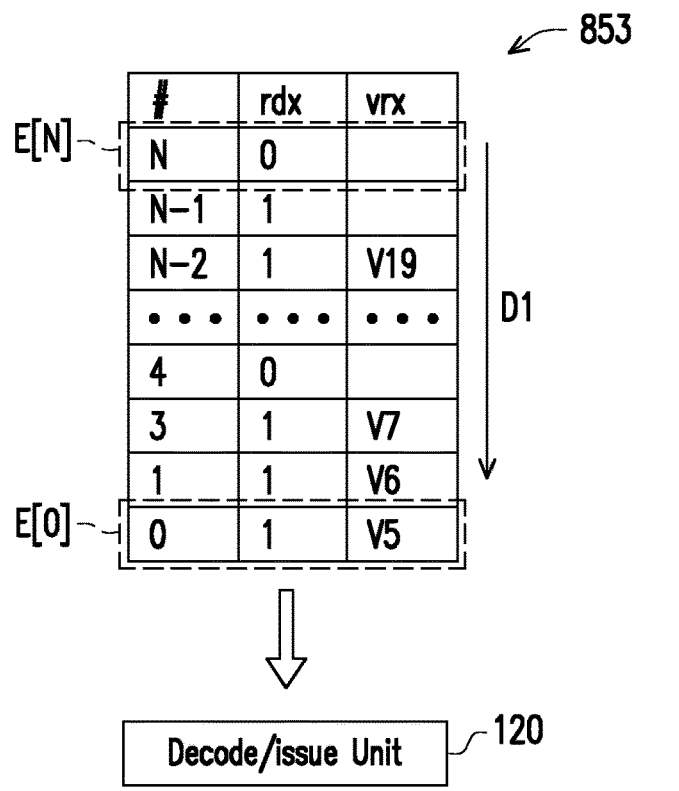
FIG. 8 is a diagram illustrating a register file read/write control unit 850 according to some embodiments of the disclosure.

FIG. 8 is a diagram illustrating a register file read/write control unit 850 according to some embodiments of the disclosure. In the embodiments, the register file read/write control unit 850 includes a read shifter 853 for each read port of the register file 140. The read shifter 853 may include a plurality of shifter entries E[0]-E[N] that are shifted every clock cycle in a direction D1. Each shifter entry of the read shifter 853 is associated with a clock cycle (e.g., kth clock cycle, where k is a positive integer), and each shifter entry includes a read value (e.g., rdx[k]) that indicates an availability of a read port of the register file 140 at the clock cycle. In some embodiments, each shifter entry further includes a register address value vrx[k] that indicates which register in the register file 140 is going to use the read port at kth clock cycle. The shifter entry E[0] is referred to as the bottom shifter entry and the shifter entry E[N] is referred to as the top shifter entry. The read shifter 330a may shift out the values of the bottom shifter entry E[0] every clock cycle. The read value rdx[k] may be a multi-bit value or a single-bit value that indicates either the logic value of "1" and the logic value of "0". For example, when the read value rdx[k] is the logic value of "1", it indicates that read port is not available for the read operation in the kth clock cycle. In other words, there is another read operation that is going to be performed using the read port in the kth clock cycle. Alternatively, when the read value rdx[k] is the logic value of "0", it indicates that the read port is available for the read operation in the kth clock cycle. In some embodiments, the read values of the read shifter 130 are set upon the dispatching of the instructions to be executed by the processor 100.

In the embodiments, the issue/decode unit 320 may control the dispatching of an instruction based on the read values rdx[0]-rdx[N] stored in the shifter entries E[0] through E[N] of the read shifter 853. The read values rdx[0]-rdx[N] are used for determining whether there is a resource conflict (particularly a read port conflict) at a particular time in the future. Taking the example illustrated in FIG. 3 as example, at dispatching of the third instruction, the decode/issue unit 120 uses this accumulated count value of 11 to check for data dependency and the availability of read port at 11$^{th}$ clock cycle in the future by accessing the read value rdx[11] stored in the read shifter 853. If there is a read port conflict, the third instruction is stalled in the decode/issue unit 120 until the next clock cycle. If no read port conflict is detected at time 11, the decode/issue unit 120 dispatches the third instruction to the execution queue 161.

Although the latency shifter for write port and the read shifter for read port are illustrated respectively in FIGS. 7 and 8, the disclosure is not intended to limit the implementation of the register file read/write control unit 150. In other embodiments, a register file read/write control unit 150 may include both the latency shifter 751 and the read shifter 853 for determining any write port and read port conflict during the issuing of an instruction from the decode/issue unit 120 to the functional unit module 160. In other embodiments, the scoreboard illustrated in FIG. 6 may also be implemented with the latency shifter 751 illustrated in FIG. 7 and the read shifter 853 illustrated in FIG. 8.

Figure 9:
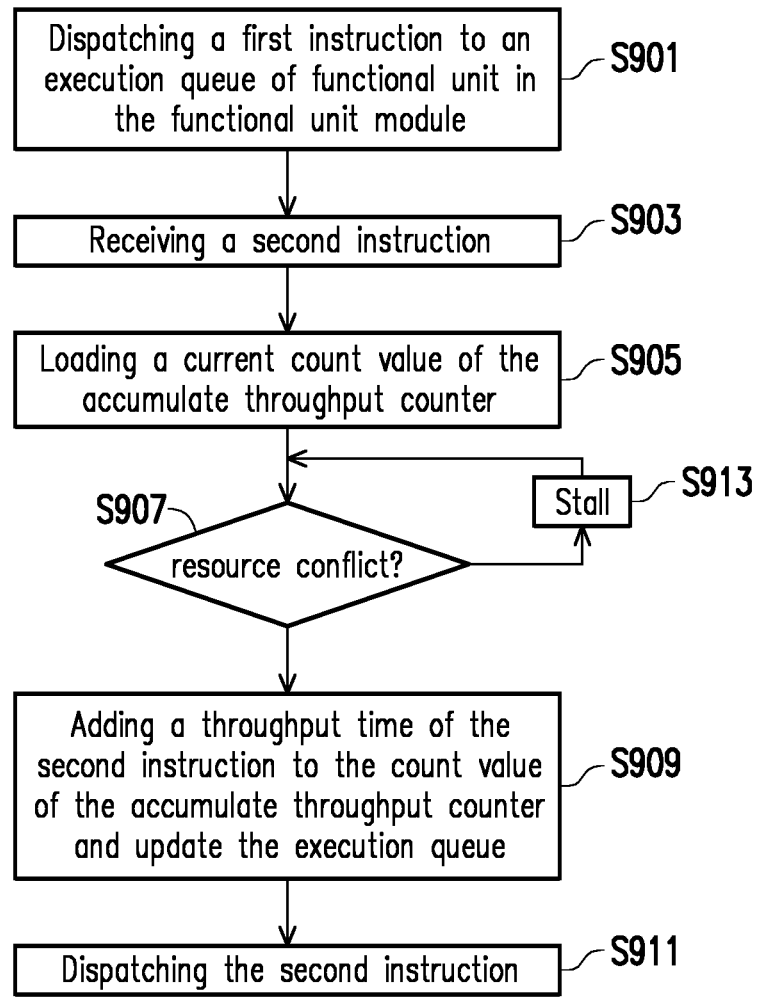
FIG. 9 is a flow diagram illustrating a process for issuing an instruction to a functional unit according to one of the embodiments of the disclosure.

FIG. 9 is a flow diagram illustrating a process for issuing an instruction to a functional unit according to one of the embodiments of the disclosure. In step S901, a first instruction is dispatched from the decode/issue unit 120 to an execution queue 161 of a functional unit in the functional unit module 160. As described above, an entry of execution queue 161 may be updated with a throughput time of the first instruction at the time of dispatching the instruction. The counter value of an accumulate throughput time is also updated. In addition, the scoreboard 130 and register file read/write control unit 150 may also be updated based on the first instruction. In step S903, a second instruction is received by the decode/issue unit 120. In step S905, a current count value of the accumulate throughput counter is loaded, where the count value would represent the number of clock cycles for the execution unit to accept the second instruction that is to be dispatched and issued. In step S907, resource conflict is checked. Based on the embodiments described above, the resource conflict may be at least one of the followings: (1) data dependency which includes write-after-read (WAR), read-after-write (RAW), and write-after-write (WAW), (2) availability of read port to read data from the register file 140 to the functional unit 160, (3) availability of the write port to write back data from the functional unit 160 to the register file 140, and (4) the availability of the execution unit 165 to execute data.

If no resource conflict, the process goes to step S909 which adds a throughput time of the second instruction to the count value of the accumulate throughput counter and update the execution queue. Then, the process goes to step S911, where the second instruction is dispatched.

If there is a resource conflict (e.g., data dependency, read port conflict, or write conflict), the process stalls for a clock cycle and return back to the beginning of checking the resource conflict at the next clock cycle. (step S913).

In accordance with one of the embodiments, a microprocessor is disclosed. The microprocessor comprises a decode/issue unit, an execution queue, an execution unit, and a counter. The decode/issue unit is configured to receive a first instruction and dispatch the first instruction. The execution queue is configured to schedule the first instruction dispatched by the decode/issue unit. The execution unit is configured to receive the scheduled first instruction issued from the execution queue and execute the first instruction. In addition, the counter is configured to store a count value representing the number of clock cycles for which the execution unit is busy with the first instruction, and decrement for every clock cycle. In the embodiments, the decode/issue unit dispatches a second instruction subsequent to the first instruction in accordance with the count value of the counter.

In accordance with one of the embodiments, a method for issuing an instruction to an execution unit coupled to an execution queue is disclosed. The method includes the following steps. A first instruction is dispatched to the execution queue. A second instruction is received after dispatching the first instruction to the execution queue. Accumulate throughput counter is accessed to obtain an accumulated throughput count value of the execution unit, wherein the accumulated throughput count value represents the number of clock cycles for the execution unit to accept the second instruction. The second instruction is dispatched to the execution queue in accordance with the accumulated throughput count value. The accumulated throughput count value decrements for every clock cycle.

In accordance with one of the embodiments, a data processing system is provided. The data processing system includes a microprocessor, a main memory coupled to the microprocessor, a bus bridge, coupled to the microprocessor, and an input/output device coupled to the bus bridge. In the embodiments, the microprocessor includes a decode/issue unit, an execution queue, an execution unit, and an accumulate throughput counter. The decode/issue unit is configured to receive a first instruction and dispatch the first instruction. The execution queue is configured to schedule the first instruction dispatched by the decode/issue unit. The execution unit is configured to receive the scheduled first instruction issued from the execution queue and execute the first instruction. In addition, the accumulate throughput counter is configured to store an accumulated throughput count value representing the number of clock cycles for which the execution unit is busy with the first instruction and decrement for every clock cycle, where the decode/issue unit dispatches a second instruction subsequent to the first instruction in accordance with the count value of the counter.

The foregoing has outlined features of several embodiments so that those skilled in the art may better understand the detailed description that follows. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. A microprocessor, comprising:
    a decode/issue unit, receiving a first instruction, and dispatching the first instruction;
    an execution queue, scheduling the first instruction dispatched by the decode/issue unit;
    an execution unit, receiving and executing the first instruction issued from the execution queue; and
    a counter, configured to store a count value representing the number of clock cycles for which the execution unit is busy with the first instruction, and decrement for every clock cycle,
    wherein the decode/issue unit dispatches a second instruction subsequent to the first instruction to the execution queue in accordance with the count value of the counter, wherein the first instruction includes a plurality of first instructions, and the count value is an accumulative value of the number of clock cycles for which the execution unit is busy with the plurality of first instructions.

2. The microprocessor of claim 1, wherein the number of clock cycles for the execution unit to complete the second instruction subsequent to the first instruction is added to the accumulative count value when the second instruction is dispatched to the execution queue by the decode/issue unit.

3. The microprocessor of claim 2, wherein at the time of dispatching the second instruction from the decode/issue unit to the execution queue, a second entry subsequent to a first entry storing the number of clock cycles for which the execution unit is busy with the first instruction is set to be valid, and the number of clock cycles for the execution unit to complete the second instruction is stored in the second entry.

4. The microprocessor of claim 1, further comprising an instruction throughput counter, configured to load and count down from a throughput count of the first instruction stored in a first entry of the execution queue before issuing the second instruction scheduled in a second entry subsequent to the first entry to the execution unit.

5. The microprocessor of claim 1, wherein the first instruction is a vector instruction comprising a plurality of micro-operations, and the microprocessor further comprises an instruction throughput counter storing a throughput count representing the number of clock cycles to complete one of the micro-operations and a micro-ops counter storing a micro-op count representing the number of micro-operations in an entry corresponding to the first instruction in the execution queue,
    wherein, when the first instruction is issued to the execution unit from the execution queue, the instruction throughput counter is configured to load and count down the throughput count corresponding to the first instruction,
    wherein the micro-ops counter is configured to load the micro-op count and decrement the micro-op count each time the instruction throughput counter reaches zero until the micro-op counter reaches zero, and
    wherein the execution queue issues the second instruction subsequent to the first instruction when the micro-op counter reaches zero to the execution unit.

6. The microprocessor of claim 1, wherein, at a first timepoint for dispatching the second instruction to the execution queue, the decode/issue unit determines whether there is a resource conflict at a second timepoint which is the number of clock cycles, in the future, specified by the count value stored in the counter starting from the first timepoint, and stalls the dispatching of the second instruction when the resource conflict is determined at the second time.

7. The microprocessor of claim 6, wherein the decode/issue unit is further configured to determine a third timepoint having no resource conflict, wherein the third timepoint is subsequent to the first timepoint and prior to the second timepoint, and the decode/issue unit dispatches the second instruction at the third timepoint and store a difference between the second and third timepoints as a pre-count value in a corresponding entry of the execution queue.

8. The microprocessor of claim 7, further comprising an instruction throughput counter, configured to load and count down from a throughput count of the first instruction stored in a first entry of the execution queue, and load and count down from a pre-count value stored in the corresponding entry of the execution queue after the instruction throughput counter loaded with the throughput count reaches zero, wherein the execution queue is configured to issue the second instruction scheduled in a second entry subsequent to the first entry to the execution unit after the instruction throughput loaded with pre-count value reaches zero.

9. The microprocessor of claim 1, further comprising:
    a scoreboard, having a plurality of scoreboard entries mapped to a plurality of registers, each scoreboard entry comprising a register accessing counter indicating the number of clock cycles for an issued instruction to access the register,
    wherein, at a first timepoint for dispatching the second instruction to the execution queue, the decode/issue unit obtains a value stored in the register accessing counter of the corresponding scoreboard entry corresponding to the register designated by the second instruction in which the value of the register accessing counter represents a second timepoint that is N clock cycle after the first timepoint in the future without data dependency, where N is a number equal to or greater than 1, and dispatches the second instruction when determined no resource conflict at the second timepoint that is N clock cycle after the first timepoint.

10. The microprocessor of claim 9, wherein when determined there is a resource conflict at the second timepoint, the decode/issue unit stalls the dispatching of the second instruction for a predetermined clock cycle, and check for the resource conflict at the second timepoint.

11. The microprocessor of claim 1, further comprising:
a register file read/write control unit storing usage of a read port of a register file for a plurality of clock cycles subsequent to a first timepoint for dispatching the second instruction,
wherein, at the first timepoint, the decode/issue unit accesses the register file read/write control unit to check for a read port conflict at a second timepoint that is N clock cycle after the first timepoint according to the count value obtained from the counter at the first timepoint, and stalls the dispatching of the second instruction for a clock cycle when determined the read port conflict at the second timepoint, and dispatches the second instruction when determined no read port conflict at the second timepoint, wherein N is equal to or greater than 1.

12. The microprocessor of claim 1, further comprising:
a register file read/write control unit storing usage of a write port of a register file for a plurality of clock cycles after a first timepoint for issuing the second instruction,
wherein, at the first timepoint, the decode/issue unit accesses the register file read/write control unit to check for a write port conflict at a second timepoint that is N clock cycle after the first timepoint according to the count value obtained from the counter at the first timepoint and a latency time for executing second instruction, stalls the dispatching of the second instruction for a clock cycle when determined the write port conflict at the second timepoint, and dispatches the second instruction when determined no write port conflict at the second timepoint, wherein N is equal to or greater than 1.

13. A method for issuing an instruction to an execution unit coupled to an execution queue, comprising:
dispatching a first instruction having a first throughput time to the execution queue and adding the first throughput time to an accumulated throughput count value of an accumulate throughput counter;
receiving a second instruction having a second throughput time after dispatching the first instruction to the execution queue;
accessing the accumulate throughput counter to obtain the accumulated throughput count value, wherein the accumulated throughput count value represents the number of clock cycles for the execution unit to accept the second instruction;
dispatching the second instruction to the execution queue in accordance with the accumulated throughput count value, and adding the second throughput time to the accumulated throughput count value; and
decrementing the accumulated throughput count value for every clock cycle.

14. The method of claim 13, wherein the first instruction includes a plurality of first instructions, and the accumulated through count value is an accumulated of the number of clock cycles for which the execution unit is busy with the plurality of the first instructions.

15. The method of claim 13, wherein the step of dispatching of the second instruction to the execution queue comprising:
storing the second throughput time to the execution queue as a throughput count corresponding to the second instruction, wherein the second throughput time represents the number of clock cycles for the execution unit to accept a third instruction in the execution queue subsequent to the second instruction.

16. The method of claim 13, further comprising:
storing the first throughput time as a throughput count of the first instruction in the execution queue;
loading the throughput count of the first instruction when the first instruction is issued from the execution queue to the execution unit;
decrementing the throughput count of the first instruction for every clock cycle; and
issuing the second instruction from the execution queue to the execution unit when the throughput count of the first instruction reaches zero.

17. The method of claim 13, wherein the first instruction is a vector instruction including a plurality of micro-operations, the method further comprising:
loading a throughput count of the micro-operation of the first instruction and loading a micro-op count representing the number of micro-operations of the first instruction when the first instruction is issued from the execution queue to the execution unit;
decrementing the throughput count for every clock cycle;
decrementing the micro-op count when the throughput count reaches zero; and
issuing the second instruction from the execution queue to the execution unit when the micro-op count reaches zero.

18. The method of claim 13, further comprising:
checking, at a first timepoint at which the second instruction is to be dispatched to the execution queue, for a resource conflict at a second timepoint that is N clock cycle after the first timepoint, wherein N is a number equal to or greater than 1 defined by the accumulate throughput count value; and
stalling the dispatching of the second instruction when the resource conflict is detected at the second timepoint.

19. The method of claim 18, further comprising:
determining a third timepoint having no resource conflict, wherein the third timepoint is after the first timepoint and before the second timepoint; and
dispatching the second instruction at the third timepoint and storing a difference between the second timepoint and the third timepoint in the execution queue as a pre-count value.

20. The method of claim 19, further comprising:
loading a throughput count of the first instruction and decrementing the throughput count for every clock cycle when the first instruction is issued from the execution queue to the execution unit; and
loading and decrementing the pre-count value when the throughput count reaches zero; and
issuing the second instruction from the execution queue to the execution unit when the pre-count value reaches zero.

21. The method of claim 13, wherein before the step of dispatching of the second instruction to the execution queue, the method further comprises:
accessing a scoreboard to obtain a register accessing count value corresponding to a register designated by the second instruction at a first timepoint for dispatching the second instruction to the execution queue, wherein the register accessing count value defines a second time point that is N clock cycle after the first timepoint which has no data dependency, wherein N is equal to or greater than 1;
checking for a resource conflict at the second time point; and
stalling the dispatching of the second instruction when the resource conflict is detected.

22. The method of claim 21, wherein the register accessing count value includes a read time and a write time, and a longest time among the read time and the write is used as the register accessing count value for checking the resource conflict.

23. The method of claim 13, wherein before the step of dispatching of the second instruction to the execution queue, the method further comprises:
accessing a register file read/write control unit at a first timepoint to check an availability of a read port at a second timepoint that is N clock cycle after the first timepoint according to the accumulated throughput count value obtained at the first timepoint, wherein N is greater than or equal to 1; and
stalling the dispatching of the second instruction when determined the read point is occupied at the second time point.

24. The method of claim 13, wherein before the step of dispatching of the second instruction to the execution queue, the method further comprises:
accessing a register file read/write control unit at a first timepoint to check an availability of a write port at a second timepoint that is N clock cycle after the first timepoint according to the accumulated throughput count value obtained at the first timepoint and a latency time for executing the second instruction, wherein the second timepoint is defined by the accumulated throughput count value, wherein N is equal to or greater than 1; and
stalling the issuing of the second instruction when determined the write port is occupied at the second timepoint.

25. A data processing system, comprising:
a microprocessor, wherein said microprocessor includes:
a decode/issue unit, receiving a first instruction, and issuing the first instruction;
a functional unit, receiving the first instruction issued by the decode/issue unit, comprising:
an execution queue, scheduling the first instruction;
an execution unit, receiving the scheduled first instruction from the execution queue and executing the first instruction;
an accumulate throughput counter, configured to store an accumulated throughput count value representing the number of clock cycles for which the execution unit is busy with the first instruction, and decrement for every clock cycle, wherein the decode/issue unit issues a second instruction subsequent to the first instruction to the execution queue before the execution unit finishes the execution of the first instruction in accordance with the accumulated throughput count value of the accumulate throughput counter, wherein the first instruction includes a plurality of first instructions, and the accumulated throughput count value is an accumulative value of the number of clock cycles for which the execution unit is busy with the plurality of first instructions;
a main memory, coupled to the microprocessor;
a bus bridge, coupled to the microprocessor; and
an input/output device, coupled to the bus bridge.

26. The data processing system of claim 25, wherein the first instruction is a vector instruction comprising a plurality of micro-operations, and the microprocessor further comprises an instruction throughput counter storing a throughput count representing the number of clock cycles to complete one of the micro-operations and a micro-ops counter storing a micro-op count representing the number of micro-operations in an entry corresponding to the first instruction in the execution queue,
wherein, when the first instruction is issued to the execution unit from the execution queue, the instruction throughput counter is configured to load and count down the throughput count corresponding to the first instruction,
wherein the micro-ops counter is configured to load the micro-op count and decrement the micro-op count each time the instruction throughput counter reaches zero until the micro-op counter reaches zero, and
wherein the execution queue issues the second instruction subsequent to the first instruction when the micro-op counter reaches zero.

27. The data processing system of claim 25, wherein, at a first timepoint for dispatching the second instruction to the execution queue, the decode/issue unit determines whether there is a resource conflict at a second timepoint which is the number of clock cycles specified by the accumulated throughput count value stored in the accumulate throughput counter that is N clock cycle after the first timepoint, and stalls the issuing of the second instruction when the resource conflict is determined at the second time, wherein N is equal to or greater than 1.

28. The data processing system of claim 25, wherein the microprocessor further comprises: a scoreboard, having a plurality of scoreboard entries mapped to a plurality of registers, each scoreboard entry comprising a register accessing counter indicating the number of clock cycles for an issued instruction to access the register,
wherein, at a first timepoint for dispatching the second instruction to the execution queue, the decode/issue unit obtains a value stored in the register accessing counter of the corresponding scoreboard entry corresponding to the register designated by the second instruction in which the value of the register accessing counter represents a second timepoint that is N clock cycle after the first timepoint in the future without data dependency, where N is equal to or greater than 1, and dispatches the second instruction when determined no resource conflict at the second timepoint that is N clock cycle after the first timepoint.

29. The data processing system of claim 25, wherein the microprocessor further comprises: a register file read/write control unit storing usage of a read port and a write port of a register file for a plurality of clock cycles subsequent to a first timepoint for dispatching the second instruction,
wherein, at the first timepoint, the decode/issue unit accesses the register file read/write control unit to check for a read port conflict at a second timepoint that is N clock cycle after the first timepoint according to the count value obtained from the counter at the first timepoint, and a write port conflict at a third timepoint that is N clock cycle after the first timepoint according to the count value obtained from the counter at the first timepoint and a latency time for executing second instruction, wherein N is equal to or greater than 1, and
wherein the decode/issue unit stalls the dispatching of the second instruction for a clock cycle, and dispatches the second instruction when determined no read port conflict at the second timepoint and no write port conflict at the third timepoint.

* * * * *